(12) United States Patent
Mason et al.

(10) Patent No.: US 6,197,233 B1
(45) Date of Patent: Mar. 6, 2001

(54) METHOD OF FORMING LOW DENSITY STRAND FOAMS

(75) Inventors: Jeffrey John Mason, Bühlertal (DE); Chau Van Vo, Souffelweyersheim; Georges Eschenlauer, Soufflenheim, both of (FR)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/190,512

(22) Filed: Nov. 12, 1998

(30) Foreign Application Priority Data

Dec. 8, 1997 (EP) .................................................. 97121594

(51) Int. Cl.[7] .................................................... B29C 44/20
(52) U.S. Cl. ............................. 264/45.9; 264/50; 264/51; 264/53
(58) Field of Search ................................. 264/50, 51, 53, 264/45.9

(56) References Cited

U.S. PATENT DOCUMENTS

| | | |
|---|---|---|
| 3,467,570 | 9/1969 | Baxter et al. . |
| 3,573,152 | 3/1971 | Wiley et al. . |
| 3,723,586 | 3/1973 | Foster et al. . |
| 3,954,365 | 5/1976 | Barth et al. . |
| 3,993,721 | 11/1976 | Soda et al. . |
| 4,192,839 | 3/1980 | Hayashi et al. . |
| 4,221,621 * | 9/1980 | Seki et al. ............................... 156/78 |
| 4,801,484 | 1/1989 | Yao et al. . |
| 4,824,720 | 4/1989 | Malone . |
| 5,109,029 | 4/1992 | Malone . |
| 5,110,841 | 5/1992 | Malone . |
| 5,124,096 | 6/1992 | Brambilla . |
| 5,124,097 | 6/1992 | Malone . |
| 5,206,082 | 4/1993 | Malone . |
| 5,288,740 | 2/1994 | Park et al. . |
| 5,405,883 | 4/1995 | Park . |

FOREIGN PATENT DOCUMENTS

| | | |
|---|---|---|
| 0 279 668 | 8/1988 | (EP) . |
| 51-75884 | 1/1978 | (JP) . |
| 60-15114 | 1/1985 | (JP) . |
| 6-263909 | 9/1994 | (JP) . |
| WO 92/16393 | 10/1992 | (WO) . |

* cited by examiner

Primary Examiner—Allan R. Kuhns

(57) ABSTRACT

The present invention relates to foamed products. More particularly, the present invention relates to foamed products comprising a plurality of coalesced extruded strands or profiles or layers of a foamed thermoplastic composition having a low density.

21 Claims, No Drawings

METHOD OF FORMING LOW DENSITY STRAND FOAMS

FIELD OF INVENTION

The present invention relates to foamed products. More particularly, the present invention relates to foamed products comprising a plurality of coalesced extruded strands or profiles of a foamed thermoplastic composition having a low density.

BACKGROUND OF INVENTION

Foamed objects comprising a plurality of coalesced distinguishable extended strands of polymers (strand foams) have been previously disclosed, for example, in U.S. Pat. Nos. 3,573,152; 3,467,570; 3,723,586; 4,192,839; 3,954,365; 3,993,721; 5,124,096; 5,405,883; 5,288,740; 5,124,097; 5,110,841; 5,109,029 and 4,801,484. Further documents describing strand foams are WO 92/16393, EP-A-0 279 668, JP 60-015114-A, JP 53-1262 and JPH6-263909. The foamed objects are prepared by extruding a foamable thermoplastic material through a multi-orifice die plate, whereby the individual foamable elements of the strand are formed, expanded and coalesced upon emerging from the die orifices. The strands can have a circular cross-section, however, the production of strands using multi-orifice dies in which the orifices can be slots, squares, holes or specials shapes has been described. The advantages of providing the multistrand product are specified to be superior strength in the plane transverse to the direction of extrusion, extrusion to a predetermined shape without any need to trim, low density product having distinguishable coalesced cellular strands, and ease of change of shape by varying design of the extrusion die.

Many of the processes described above pertain to the production of strand foams on the basis of polyethylene, polypropylene or polyvinylchloride. Although these strand foams are excellently suited for a multitude of applications, there is a great need to provide strand foams based on other polymers, for example, polystyrene.

U.S. Pat. No. 3,993,721 discloses a process and extrusion die for preparing foam articles of thermoplastic resin, for example, polystyrene, having a hard and a smooth surface and resembling natural wood. The polymer/blowing agent mixture is extruded through a tiered die plate having a peripheral portion and a protruding interior portion. Each of the portions is provided with a plurality of apertures, the aperture density of the peripheral portion being greater than that of the interior portion. A cooling frame mounted adjacent the resin discharge plate forms a restrictive contact zone in which foamable strands are extruded and coalesced thereafter. A disadvantage of this process is that only foams of a relatively high density, for example, 200 kg/m$^3$ and more, can be manufactured. Further, this process is restricted to hydrocarbon blowing agents and produces foams exhibiting poor insulation values and dimensional stabilities.

JP 60-015114-A discloses a process for producing a foamed product comprising bundling and binding extruded and foamed-free thermoplastic styrene resin rods so that at least the rods arranged at the outermost layer comprise partly or fully foamed thermoplastic polystyrene resin containing at least 5 weight percent elastomer and the density of the rods is reduced stepwise from the outermost layer to the inner layers. The product has a high impact resistance due to the outermost layer and a low bending strength with inner layers. The foam density varies from 300 to 600 kg/m$^3$. A drawback of this process is that it is restricted to the production of foams having a high density. Moreover, unsatisfactory insulation values and dimensional stabilities are achieved.

U.S. Pat. No. 3,573,152 discloses a process for producing strand foams of polystyrene and polyethylene. The foamable materials are extruded through a multi-orifice die. The expandable strands are fused or coalesced into an integral shape. Blowing agent is used in an amount of 5 to 50 weight percent, wherein a cellular foam of a density from 16 to 64 kg/m$^3$ is obtained. For polystyrene, hydrocarbons are disclosed as blowing agents. A disadvantage of this process is that the products thereof often do not possess sufficient dimensional stability and insulation values.

U.S. Pat. No. 3,467,570 discloses extruded foam thermoplastic resin boards having a cross-section at right angles to its length, consisting of a network of the extruded foamed material having enclosed within each of the meshes of the network, a strand of the extruded foamed material, such that the board as a whole has a substantially uniform cross-section. The resin, for example, polystyrene, is produced by extruding foamable polystyrene through a die having a plurality of channels in the form of a network of square or triangular meshes and each mesh has a central passage. The density of the resulting product is 14.4 to 32 kg/m$^3$. The blowing agent is a hydrocarbon, for example, butane or isobutene. A drawback of the thus obtained foams is that their insulation values and dimensional stability are often unsatisfactory.

U.S. Pat. No. 3,723,586 is a further development of the above-mentioned U.S. Pat. No. 3,467,570. A process of extruding foamable polystyrene through a die having a plurality of channels in the form of a network of meshes is disclosed, wherein each mesh has a central passage with extended grooves to four corners of the mesh. The slits are arranged in a symmetrical network of square meshes, with extended grooves from the central passage to four corners of the surrounding mesh. As blowing agent hydrocarbons such as butane or isobutene are used. The resulting product has a density of 14.4 to 24 kg/m$^3$. This process also generates foams exhibiting no satisfactory properties as regards to insulation value and dimensional stability.

U.S. Pat. No. 4,192,839 discloses a process for producing an expanded article of a crystalline thermoplastic resin by extruding and expanding a foamable resin mixture through a die having a plurality of apertures therein and a frame for expansion. The cross-sectional area occupied by the separate resin mixture streams at the entrance of the extrusion area is from 5 to 30 percent of the total cross-sectional area at the exit of the extrusion area. After leaving the extrusion area, the streams are passed directly into a confined zone defined by the frame and maintained at a temperature at least 30° C. lower than the temperature of the resin streams prior to the exiting. This forms a plurality of soft expanded resin strands. By simultaneously removing gases generated in the course of extrusion and expansion, the formation of voids between strands is avoided. Apart from the fact that the removal of gases is very laborious, no products having high insulation values and sufficient dimensional stability are obtained.

EP-A-0 279 668 describes closed-cell foams, particularly suitable for use in packaging applications, comprising a plurality of coalesced parallel strands or profiles of thermoplastic resin, for example, an alkenyl aromatic thermoplastic synthetic resin, such as, polystyrene. The volatile blowing agents are those conventionally known for alkenyl aromatic thermoplastic resin foams. Although according to the method of EP-A-0 279 668 products of high quality are obtained, there is the problem that often individual strands do not sufficiently adhere to one another or that voids remain between individual strands.

U.S. Pat. No. 5,288,740 discloses a process for making closed-cell, alkenyl aromatic polymer foam packing bodies. An alkenyl aromatic polymer material is heated to form a melt into which a blowing agent is incorporated at an elevated pressure to form a foamable gel. The foamable gel is extruded through a die to form a foam strand. The foam strand is pelletized to form a plurality of foam bodies. These bodies are further expanded by exposing them one or more times to heated air or resin streams. Among others, carbon dioxide and water are mentioned as blowing agents. The described process, however, has the disadvantage that coalescing of the expanded pellets can only be obtained by melting the pellet surface. This, however, results in zones of elevated foam density in the area of the interfaces between individual pellets and thus to a deterioration of the insulation values. A further disadvantage of this process lies in that no continuous foam structures are obtained, thus resulting in a structure with interfaces not only parallel to the direction of extrusion, but also perpendicular to the extruded direction. Such a structure has inherently lower bond strength and poor resistance to water permeation due to the high number of interfaces per unit volume.

Thus, it would be desirable to provide a strand foam comprising a polystyrene-based resin having excellent insulating and dimensional stability properties at a low density. It would also be desirable to provide a method for producing a polystyrene-based strand foam which is simple, inexpensive and environmentally acceptable and results in products having good physical properties.

SUMMARY OF THE INVENTION

In one aspect, the present invention thus pertains to a method for producing a low density alkylene aromatic polymer or copolymer multistrand or coalesced strand foam, comprising the steps of: (a) providing a foamable composition comprising at least one polymer selected from alkylene aromatic polymers and alkylene aromatic copolymers and a blowing agent formulation, (b) extruding the composition through a die having a plurality of orifices, (c) foaming the extruded composition at a foaming temperature which is above the glass-transition temperature or the melting temperature of the polymer or copolymer, (d) maintaining the foaming product at an elevated temperature for a sufficient period of time to obtain adhesion between individual foam strands and (e) allowing the foamed product to cool, characterized in that in steps (d) and (e) the foam temperature is controlled based on the thermodynamic nature of the blowing agent formulation.

When using a blowing agent formulation having low evaporative cooling capacity, such as a formulation mainly comprising $CO_2$, it was found that an accelerated cooling during step (e) is required to obtain a thick strand foam product having excellent quality. In contrast, when using a blowing agent formulation having high evaporative cooling capacity, such as a formulation mainly comprising organic blowing agents, it was found that an additional transfer of heat to the composition during step (d) is required.

In a further aspect, the invention relates to a polymer or copolymer multistrand foam, obtainable by the method as described above. This product has excellent properties with regard to thermal insulation, dimensional stability, water diffusion resistance and water vapor permeation resistance.

DETAILED DESCRIPTION OF THE INVENTION

According to the present invention a foamable composition comprising at least one polymer selected from alkylene aromatic polymers and alkylene aromatic copolymers is provided. The composition may comprise a single polymer, a single copolymer, mixtures of polymers, mixtures of copolymers and mixtures of polymers and copolymers.

It has been discovered that alkylene aromatic, for example, styrenic polymer or copolymer multistrand or coalesced strand foam, for example, honeycomb foam, can be produced on-line without using adhesive additives or any additional mechanical device to enhance the adhesion between strands or layers. The coalesced strand foam can be made with polystyrene and styrenic copolymers, for example, copolymers comprising styrene and other compatible monomers.

An alkylene aromatic polymer according to the present invention is preferably comprised of monovinylidene aromatic monomers. Preferred examples thereof are styrene, alkylstyrenes, for example, styrenes having at least one $C_1$–$C_4$ alkyl substituent located on the aromatic ring and/or on the vinylidene residue, and halogenated styrenes. Specific examples are styrene, α-methylstyrene, a styrene having at least one alkyl and/or halo substituent on the aromatic ring, such as o-methylstyrene, m-methylstyrene or p-methylstyrene or the corresponding ethylstyrenes or chlorostyrenes, vinylxylene or mixtures thereof. An alkylene aromatic copolymer is comprised of alkylene aromatic monomers and other polymerizable monomers, wherein the alkylene aromatic monomers preferably are present in an amount of at least 50 percent by weight, more preferably in an amount of at least 70 percent by weight, and most preferably in an amount of at least 85 percent by weight based on the weight of the total monomers. The other polymerizable monomers preferably are selected from acrylic-monomers, for example, acrylonitrile, acrylic acid, acrylic esters such as butyl acrylate, olefinic monomers such as ethylene and propylene, or mono- or poly-unsaturated olefinic monomers, for example, butadiene, isoprene, or mixtures thereof.

The foamable composition further comprises a blowing agent formulation. According to the first aspect of the present invention the blowing agent formulation has a low evaporative cooling capacity. Typically, such a blowing agent composition comprises a major amount of, or solely of, a blowing agent which exhibits a low evaporative cooling capacity during the foaming process, or mixtures of such blowing agents. Examples of suitable low evaporative cooling capacity blowing agents are carbon dioxide, nitrogen, noble gases, such as argon, nitrous oxides, such as NO, $NO_2$ and $N_2O$, and air. These blowing agents can be added to the foaming composition. However, for example, in the case of $N_2$ and $CO_2$, they can also be produced in situ by adding chemical compounds to the composition which decompose and generate gas, such as known typically in the art, for example, azo-type compounds for the generation of $N_2$ and mixtures of carbonates and acids for the generation of carbon dioxide. The presence of small amounts of co-blowing agents with higher evaporative cooling capacity in combination with major amounts of such low evaporative cooling capacity blowing agents, also results in thermodynamic behavior similar to that of formulations composed solely of low evaporative cooling capacity blowing agents.

When using a low evaporative cooling capacity blowing agent formulation as defined above, the blowing agent formulation has little heat of vaporization at the foaming composition temperature. As a result, the temperature of the foaming composition changes to only a minor extent during the expansion stage (d).

Thus, when using a low evaporative cooling capacity blowing agent formulation, a proper strand surface temperature for promoting adhesion exists for several seconds after passage through the extrusion die, typically at least until strand coalescence occurs, and therefore step (d) of the process requires little, if any, heating of the extrusion die or environment near the extrusion die face to a temperature above the foaming composition temperature.

Trials to produce polystyrene strand foams using low evaporative cooling capacity blowing agent formulations on the lab scale with small cross-sections and high surface area-to-volume ratios (product thickness 2 cm, total cross-section 5 cm$^2$) showed that foams with very low void contents (0.1 to 1 percent) could be produced without any forced cooling steps after coalescence of the foam strands. However, when using a low evaporative cooling capacity blowing agent formulation to produce polystyrene foams on a larger scale with larger cross-sections and higher thicknesses, such as a cross-section of at least 20 cm$^2$ and/or a thickness of at least 3 cm, the resulting polystyrene strand foams have voids, for example, cavities and/or channels between individual strands which lead to an undesired deterioration of properties, such as adhesion (shear and tensile strength) and resistance to water pickup and water vapor transmission. Use of prior techniques such as described in U.S. Pat. No. 3,573,152 were not suitable to avoid formation of large voids between strands on thicker and larger cross-section stranded foam structures with such low evaporative cooling capacity formulations.

According to the present invention it has been surprisingly discovered that upon accelerated cooling of the foam matrix produced with such low evaporative cooling capacity blowing agent formulations, the occurrence of voids between individual strands can be greatly reduced or completely avoided. Accelerated cooling after extrusion can, for instance, be achieved by contacting the foamed product with water, for example, by immersing or spraying, or by other rapid cooling techniques, such that the foam matrix is cooled and thereby strengthened quickly, largely before atmospheric and shrinkage forces can force open voids and/or channels between strands by overcoming the adhesion developed by coalescence during foaming. By making simple experiments a person skilled in the art can easily determine the appropriate time and amount of accelerated or forced cooling necessary to avoid void formation after the departure from the extrusion die. When using $CO_2$ or mixtures of $CO_2$ and minor amounts of water as blowing agents, good results were obtained when immersion in water was performed within 5 to 20 seconds after departure from the extrusion die.

According to the second aspect of the present invention, a high evaporative cooling capacity blowing agent formulation is used. Typically, such a blowing agent composition comprises a major amount of, or solely of, a blowing agent which exhibits a high evaporative cooling capacity during the foaming process, or a mixture of such blowing agents. Examples of such high evaporative cooling capacity blowing agents include hydrocarbons, ethers, halogenated hydrocarbons, especially partially halogenated hydrocarbons, lower alcohols, water, ammonia or mixtures thereof. These blowing agents can be added to the foaming composition. However, for example, in the case of $NH_3$, they can also be produced in situ by adding chemical compounds to the composition which decompose and generate gas, for example, ammonium compounds for the generation of $NH_3$. The presence of small amounts of co-blowing agents with low evaporative cooling capacity in combination with major amounts of such high evaporative cooling capacity blowing agents also results in thermodynamic behavior similar to that of formulations composed solely of high evaporative cooling capacity blowing agents.

Suitable examples of hydrocarbons are ethane, ethylene, propane, propylene, butane, butylene, isobutane, isobutene, pentane, neopentane, isopentane, cyclopentane, hexane, heptane, cyclohexane or mixtures thereof. Suitable examples of ethers are dimethyl ether (DME), methyl ethyl ether, or diethyl ether. Suitable examples of lower alcohols are methanol, ethanol, propanol, isopropanol, butanol, pentanol, hexanol and mixtures thereof, wherein ethanol is preferred. Examples of partially halogenated hydrocarbons are chloroethane, chlorodifluoromethane (R-22), 1-chloro-1,1-difluoroethane (R-142b), 1,1,1,2-tetrafluoroethane (R-134a), 1,1,2,2-tetrafluoroethane (R-134), 2-chloro-1,1,1,2-tetrafluoroethane (R-124), pentafluoroethane (R-125), 1,1-difluoroethane (R-152a), 1,1,1-trifluoroethane (R-143a), 1-fluoroethane (R-161), difluoromethane (R-32), 1,1,1,3,3-pentafluoropropane (HFC-245 fa), 1,1,1,3,3-pentafluorobutane (HFC-365 mfc), and mixtures thereof.

When using a high evaporative cooling capacity blowing agent formulation as defined above, the foaming of the polymer occurring in step (c) of the production process results in an endothermic reaction which tends to substantially reduce the temperature of the surrounding material.

When producing a strand foam using a high evaporative cooling capacity blowing agent formulation, good adhesion between adjacent strands has been difficult to achieve. According to the present invention it was surprisingly found that to ensure a sufficiently strong adhesion between individual strands with such formulations, additional heat must be transferred to the composition prior to strand coalescence. This can be accomplished, for example, by additionally heating the composition to a temperature above the foaming temperature as it passes through the extrusion die, or by heating the environment directly adjacent to the extrusion die face, to such an extent that a sufficiently high foam strand surface temperature is maintained throughout the point in time at which the expanding strands coalesce. Said heating can be accomplished in various ways, such that either (a) the extrusion die structure, or (b) the individual foam strand surfaces are heated above the bulk foaming composition temperature. For example, the required temperature control of the extrusion die and the foamed product can be accomplished by external heating bands, temperature-controlled circulation jackets, internal temperature-controlled circulation channels or other heating devices, thermal conduction from upstream and/or downstream extrusion or conveying equipment, infrared radiation, forced ventilation of the die face with heated gas, direct contact of the foaming strand surfaces with a heated or temperature-controlled fluid media, or by other means known in the art. When sufficient heat is transferred to the composition in this way, a strand foam product substantially without voids between individual strands and with strong interstrand adhesion is obtained.

Thus, according to the present invention it was found that strand foams based on alkylene aromatic polymers require a processing control based on the overall thermodynamic nature of the blowing agent formulation. When using high evaporative cooling capacity blowing agent formulations, an additional transfer of heat to the foaming composition is required to enhance interstrand adhesion, whereas the use of accelerated cooling is of little added value in producing an excellent product. In contrast thereto, when using low evaporative cooling capacity blowing agent formulations, accelerated cooling of the foamed product is required to avoid the formation of interstrand voids, whereas additional heat transfer to the foaming composition is of little added value in producing an excellent product.

Typically, a blowing agent formulation with a high evaporative cooling capacity can be predicted theoretically, by means of heat of vaporization, to cause a cooling effect of several degrees Celsius during steps (b) and (c) of the process as described above.

The definition of the thermodynamic nature of a blowing agent formulation is useful in helping the skilled practitioner predict the tendency of stranded foam structures to require either accelerated cooling of the foamed product or additional heating prior to strand coalescence for producing an excellent stranded foam product. The exact process steps necessary to achieve a good quality stranded foam structure for a particular blowing agent formulation can be determined easily by the practitioner skilled in the art of foaming by applying the techniques described in this invention.

Preferable in all cases are blowing agent compositions which have no ozone depletion potential (ODP), namely fluorinated alkanes, inorganic blowing agents, alcohols, ethers, hydrocarbons, or combinations thereof. Particularly suitable are blowing agent compositions composed primarily of carbon dioxide, and mixtures of carbon dioxide with water or ethanol or isopropanol or dimethyl ether, or mixtures of two or more of these. Compositions based on (i) 1,1,1,2-tetrafluoroethane, (ii) 1,1,2,2-tetrafluoroethane, (iii) 1,1-difluoroethane, (iv) mixtures of two or more of these or (v) mixtures of each compound or mixture with at least one of ethanol, isopropanol, dimethyl ether, water and carbon dioxide, are also quite suitable in the practice of the present invention. Additionally, compositions based on dimethyl ether and mixtures of dimethyl ether with at least one of water, ethanol, isopropanol and carbon dioxide are also suitable in the practice of the present invention. Compositions based on a mixture of dimethyl ether or carbon dioxide or hydrofluorocarbons or mixtures of one or more of these with suitable hydrocarbons, such as propane, butane, isobutane, pentane, isopentane, neopentane or cyclopentane are also suitable in the practice of this invention.

Apart from the blowing agent the composition may also comprise further additives, such as nucleating agents, extrusion aids, antioxidants, flame retardants, colorants or pigments. Examples of pigments are carbon black or titanium dioxide or graphite and other compounds known in the art to further enhance thermal insulation properties of foamed products.

According to the present invention, foam structures comprising a plurality of strands and having a large cross-section can be produced. The present invention is particularly suitable for producing foamed products with excellent thermal insulation characteristics with cross-sections of at least 150 $cm^2$ or more, more preferably at least 500 $cm^2$ or more. It should be noted, however, that also foams having smaller cross-sections can be produced with the same advantages as previously described. The cross-sectional area of individual foam strands can be varied over a broad range. Usually the cross-section of a single foam strand is in the range of from 5 $mm^2$ up to 25 $cm^2$, preferably of from 15 $mm^2$ to 10 $cm^2$.

Surprisingly, it was found that the polymer or copolymer composition could be substantially free from adhesive additives, for example, ethyl vinyl alcohol copolymer (EVA), ethyl acrylic acid copolymer (EAA) or other adhesive agents known in the art. Preferably, the adhesive additives are present in an amount lower than 5 percent by weight, more preferably in an amount lower than 1 percent by weight based on the total polymer or copolymer composition. Most preferably, the composition is free from adhesive additives.

The use of adhesive additives, while not necessary for the easy production of, the final properties of or the excellent performance of the foams of this invention, may however, be employed additionally such as is known in the art. Delivery methods of such adhesive additives would include mixing in the polymer, addition during any stage of the extrusion process, or application of suitable adhesives during or after passage through the extrusion die, all such as known in the art.

According to the present invention, the polymer and blowing agents preferably are mixed in a mixer or in the extruder, and afterwards the mixed composition is cooled down prior to extrusion. Then, the composition, usually being in the form of a gel, is forced through a plurality of die orifices, preferably through a die plate comprising a plurality of small holes in a suitably desired spatial arrangement, for example, in an oscillating form such as a sinusoidal wave, honeycomb, square, saw tooth or triangular saw tooth wave pattern. For example, alternating slits are offset so that maxima and minima of adjacent rows are aligned with one another so as to ensure contact between rows of extrudated product, whereby a honeycomb-shaped foam structure of separately extruded and thereafter coalesced profiles is obtained. Such foams prepared, wherein the adjoining profiles contain sections adjacent to one another having significant surface areas in mutual contact, are particularly desired in order to provide structures of improved strength. General teachings for the preparation of strand foam can be found in U.S. Pat. Nos. 4,824,720; 5,109,029; 5,206,082; 5,288,740, and WO 92/16363.

The shape of the orifices can be round, square or polygonal, such as X-, cross- or star-shaped. Further, when using a variety of orifices having different shapes, the resulting foam can be produced with a specific profile or shape. This may also be accomplished separately with variations in the spatial arrangement of some or all of the orifices, or utilizing a combination of differently shaped orifices and spatial arrangements.

According to the present invention it is preferred that the first contact between individual foam strands occurs after the departure from the respective die orifices. Further, it is preferred that the process according to the present invention is not carried out in a closed molding box but rather that a free molding of the foam product is conducted, optionally in an intermediate space between two plates. Furthermore, it is preferred in the process according to the invention that the total area of the openings of the dies used is $\leq 10$ percent, more preferably $\leq 5$ percent and most preferably $\leq 3$ percent in relation to the cross-section of the resulting foam product.

In order to enhance the self-adhesion between individual strands, the foaming temperature is above the glass transition temperature or the melting temperature of the polymer or copolymer. The difference in temperature is preferably 1° C. to 50° C., more preferably 2° C. to 40° C., and most preferably 5° C. to 30° C. Furthermore, it is preferred that the theoretical diameter of an individual strand (T) is higher than the distance between the orifices (D). The ratio T/D which is defined as cohesion ratio (C) is thus preferably greater than or equal to 1, more preferably the cohesion ratio is greater than or equal to 1.2. The theoretical diameter of each strand can be calculated based on the foam volume expansion and extrusion-direction speed of the product. The foam volume can be calculated from mass balance and foaming temperature. It can also be deduced from the foam density measurement.

Further, the present invention comprises using conventional co-extrusion technology to co-extrude multiple polymer/blowing agent systems. The nature of each polymer or each blowing agent can be different. It is, however, important that the foaming temperature for each system is above the glass-transition temperature or the melting temperature of each polymer or copolymer, and preferably the cohesion ratio is equal to or larger than 1.

When producing a multistrand or coalesced strand foam comprising multiple polymer/blowing agent systems, the present invention further comprises co-extruding an alkylene aromatic foamable polymer and copolymer and another foamable polymer or copolymer through the multi-orifice die, whereby a foam composition is produced comprising at least one alkylene aromatic polymer or copolymer foam component and at least one non-alkylene aromatic polymer or copolymer foam component.

For example, the outer strands of a foam composition can be made of polypropylene with a hydrocarbon blowing agent, for example, butane, and the inner multistrand foams are made with a styrene-based polymer and, for example, $CO_2$ and/or hydrofluorocarbons as blowing agent. The resulting composite foam offers a very good insulation value, thanks to the extruded polystyrene foam core, and a high service temperature and good chemical resistance due to the performance of the polypropylene outer shell.

An alkylene aromatic polymer or copolymer multistrand foam which is obtainable by the method of the present invention preferably has a density of up to 150 kg/m$^3$. More preferably, the density is from 16 to 80 kg/m$^3$.

The expansion of the foam after leaving the extrusion die can be carried out in a normal atmospheric environment. For the expansion, however, also a sub-atmospheric environment, for example, partial vacuum, a super-atmospheric environment, for example, overpressure, and atmospheres having various gaseous compositions, for example, an elevated $CO_2$ content, can be selected, such as is known in the art.

The foamed product can be transported away from the extrusion die by various conveying devices known in the art, such as, for example, continuous belts, or rollers. These devices may additionally comprise means for temperature control as appropriate.

Further, the foam product which is produced according to the present invention is suitable for use in processes involving devices for reducing density after the initial foam expansion, for example, infrared ovens, steam ovens, hot air ovens or combinations of such devices.

If desired, the foam product can be subjected to post-treatment procedures, such as embossing, remelting and other techniques known in the art to modify the outer surface of the foam product. Additionally, the bonding of a polymer film such as polyethylene to the outer surface of the product may also be employed for this purpose. By these techniques the appearance of the foam can be made more uniform or the surface properties, for example, of the final foam product, may be changed.

According to the present invention, a strand foam with improved properties is provided. By using the present invention, a foam having a large cross-section, a substantially closed-cell structure and a low density can be produced. The foam of the invention preferably has an average cell size ranging from 25 to 3000 micrometers ($\mu$m), preferably 50 to 2000 $\mu$m, and more preferably 100 to 1500 $\mu$m. This foam presents superior thermal insulation performance and dimensional stability in comparison with the foams of the prior art.

The strand foam according to the present invention preferably has an improvement in the thermal conductivity value of at least 1.5 percent, more preferably of at least 3 percent, and most preferably of at least 5 percent over a monolithic foam having the same density and thickness and produced from the same polymer/blowing agent composition. "Monolithic" as used herein means a single, integral unit.

A preferred feature of the process and resulting foam product according to the present invention is that the foam structure is composed of a plurality of closed cells, preferably a closed-cell content as measured by ASTM D 2856-90 of at least 90 percent, and more preferably of at least 95 percent.

A further advantage of the foam according to the present invention over expanded foam structures produced by means of the prior art is that continuous strands in the direction of extrusion can be obtained. Further, it is preferred that according to the present invention the interface between individual strands substantially does not exhibit any zones or only very small zones having an increased foam density. These features are of particular advantage over expanded strand polystyrene foams according to the prior art, for example, U.S. Pat. No. 5,285,740.

A further preferred feature of the foam product according to the present invention is that a minimum tensile strength, for example, as measured by ASTM D-1623 of at least 10 kPa, more preferably of at least 25 kPa and most preferably 75 kPa or higher is obtained. Further, the shear strength of the foamed product, for example, as measured by ASTM C-273 is preferably at least 10 kPa, more preferably at least 50 kPa and most preferably 150 kPa or higher.

A further preferred feature of a foam according to the present invention is that there are substantially no voids when cutting the foam perpendicular to the direction of extrusion. Preferably, the void area is less than 1 percent, and more preferably less than 0.5 percent based on the total cross-section of the foam. Most preferably, there are no voids at all.

The substantially voidless strand foams have at least substantially equal water vapor permeability and water diffusion resistance as comparable monolithic foams of similar cross-section and composition.

Further, the present invention is illustrated by the following examples. In these examples, all parts and percentages are given by weight, unless explicitly mentioned.

EXAMPLE 1

A honeycomb polystyrene foam (Sample L-1) was produced using a 1.9 cm (¾ inch) extruder, 100 phr (part per hundred of resin) polystyrene (PS) with a glass transition temperature of 105° C., 0.65 phr of additives comprised of extrusion aids and colorant, and 4.9 phr of carbon dioxide. The foaming temperature was set at approximately 112° C. The gel was extruded into atmospheric pressure through a plate of 7 orifices each having a diameter of 1.32 mm. The distance between these holes was 5.6 mm. The honeycomb foam, composed of 7 coalesced foam strands, was produced without using any adhesive material. The foam had a density of 41 kg/m$^3$, a cell size of 0.24 mm, a cross-section of 448 mm$^2$. The cohesion ratio C (the ratio of the diameter of individual strands and the distance between orifices) was 1.55.

Another honeycomb polystyrene foam (Sample L-2) was prepared using the process described like Sample L-1, but was produced using a polymer-copolymer blend with a glass transition temperature of 103° C., composed of 90 phr (parts per 100 of resin) polystyrene and 10 phr styrene/α-methyl styrene copolymer (SaMS). The foaming temperature was set at approximately 112° C. The density of this honeycomb foam was 40.5 kg/m³, the cell size 0.30 mm, the cross-section of 492 mm², and the cohesion ratio C=1.62.

Data are shown in Table I. Samples L-1 and L-2 clearly show that a low density strand foam with good interstrand adhesion and minimal void content can be achieved by the process described in this invention.

An accelerated cooling was not necessary to avoid the formation of voids for Samples L-1 and L-2 due to their very low thickness (20 mm), small cross-section (4.5 to 5 cm²), and the very high surface area-to-volume aspect ratio of these samples, all of which combined to allow a very rapid cooling of the structure by the surrounding environment without the need for accelerated cooling.

EXAMPLE 2

A honeycomb foam was produced using a 5.08 cm (2 inch) diameter extruder and a polymer-copolymer blend of polystyrene and styrene/α-methyl styrene copolymer of 90 and 10 phr (percent per hundred of resin) respectively. The additives composed of extrusion aid, colorant and cell size enlarger were used in an amount of 0.6 phr. The blowing agent was carbon dioxide in an amount of 4.6 phr. The gel was mixed in a mixer, and cooled down through several heat exchangers. The gel was then extruded through a multiple orifice die at 118° C. The cohesion ratio C was 1.52. After leaving the extrusion die the foam was subjected to an accelerated cooling by immersing in water. A regular honeycomb structure was obtained, and this was achieved without any adhesive substance or additional mechanical devices to enhance the adhesion.

The honeycomb foam has a large cross-section (thickness 55 mm, width 200 mm), a low density of 39.6 kg/m³ and a cell size of 0.33 mm. The foam exhibited good mechanical strength, excellent thermal insulation properties, excellent dimensional stability at high temperature and very good water vapor permeability resistance.

Data are presented in Table II, Sample ST-1.

EXAMPLE 3

A foam was produced similar to Example 2, except that the formulation contained a flame retardant HBCD of 2.5 phr, and carbon dioxide was used at 4.7 phr. The honeycomb foam was obtained with a cohesion ratio of 1.65. The foam had a large cross-section (thickness 60 mm, width 220 mm), a low density of 37.1 kg/m³ and a cell size of 0.39 mm. Like the Sample ST-1, the new foam exhibited good mechanical strength, excellent thermal insulation properties, good thermal dimensional stability and very good water vapor permeability resistance.

Data are shown in Table II, Sample ST-2.

TABLE I

|  | Unit | Sample L-1 | Sample L-2 |
| --- | --- | --- | --- |
| PS | phr | 100 | 90 |
| SaMS | phr | 0 | 10 |
| Additive | phr | 0.7 | 0.7 |
| $CO_2$ | phr | 4.9 | 4.9 |
| Strand die diameter d | mm | 1.32 | 1.32 |
| Distance between hole D | mm | 5.6 | 5.6 |
| Number of holes n | holes | 7 | 7 |
| Foaming temperature | ° C. | 112 | 112 |
| Foam density | kg/m³ | 41 | 40.5 |
| Foam cell size | mm | 0.24 | 0.30 |
| Foam volume V | mm³/s | 29133 | 29492 |
| Foam linear speed L | mm/s | 65 | 60 |
| Foam board cross-section S | mm² | 448 | 492 |
| Strand foam diameter T | mm | 8.7 | 9.1 |
| Cohesion ratio T/D |  | 1.55 | 1.62 |
| Void content | % | <0.5 | <0.5 |

TABLE II

|  | Unit | Sample ST-1 | Sample ST-2 |
| --- | --- | --- | --- |
| PS | phr | 90 | 90 |
| SaMS | phr | 10 | 10 |
| Additives | phr | 0.6 | 1.0 |
| HBCD | phr | 0.0 | 2.5 |
| $CO_2$ | phr | 4.6 | 4.7 |
| Strand die diameter d | mm | 1.32 | 1.32 |
| Distance between hole D | mm | 5.6 | 5.6 |
| Number of holes n | holes | 182 | 182 |
| Foaming temperature | ° C. | 118 | 118 |
| Foam density | kg/m³ | 40.1 | 38.2 |
| Foam volume V | mm³/s | 408700 | 509017 |
| Foam linear speed L | mm/s | 36.5 | 38.5 |
| Foam board cross-section S | mm² | 11197 | 13221 |
| Strand foam diameter T | mm | 8.49 | 9.22 |
| Cohesion ratio T/D |  | 1.52 | 1.65 |
| Foam properties |  |  |  |
| Void content | % | 0 | <0.5 |
| Foam thickness | mm | 55 | 60 |
| Aged density | kg/m³ | 39.6 | 37.1 |
| Cell size Vertical | mm | 0.33 | 0.34 |
| Cell size Extrusion | mm | 0.37 | 0.39 |
| Cell size Horizontal | mm | 0.34 | 0.38 |
| Compressive strength V | kPa | 223 | 194 |
| Compressive strength E | kPa | 409 | 344 |
| Compressive strength H | kPa | 237 | 213 |
| Lambda value at 10° C. | mW/m · K | 32.2 | 32.7 |
| Lambda value at 24° C. | mW/m · K | 34.0 | 34.8 |
| DIN 18164, weight deflection (WD) test, average | % | 1.7 | 3.5 |
| Heat distortion temperature (HDT), based on ASTM D 2126-76 | ° C. | 91 | 91 |
| Water Vapor Permeability, SIA 279 | ng/Pa · s · m | 1.6 | 1.58 |
| Water Vapor Resistance, SIA 279, μ-value | — | 125 | 127 |

EXAMPLE 4

A foam composed of a polymer-copolymer blend (90 phr polystyrene and 10 phr styrene-α-methylstyrene copolymer) was produced using a 1.9 cm (¾ inch) extruder similar to Example 2 using a blowing agent formulation comprising a major part of $CO_2$ and a small amount of water.

Data are shown in Table III, Sample ST-3. Sample ST-3 shows that a stranded foam with low void content, high closed-cell content, good adhesion between strands, low density (32.7 kg/m³) and good water vapor permeation resistance can be produced by the process described in this invention with a $CO_2$/water blowing agent formulation.

TABLE III

| | Unit | Sample ST-3 |
|---|---|---|
| PS | phr | 90 |
| SaMS | phr | 10 |
| Additives | phr | 0.95 |
| $CO_2$ | phr | 4.7 |
| Water | phr | 0.3 |
| Strand die diameter, d | mm | 2.25 |
| Distance between holes, D | mm | 7.0 |
| Number of holes open, n | holes | 15 |
| Foaming temperature | °C. | 118 |
| Foam density | kg/m$^3$ | 32.7 |
| Foam board cross-section | mm$^2$ | 6600 |
| Foam volume | mm$^3$/s | 447000 |
| Foam linear speed, L | mm/s | 67.7 |
| Strand foam diameter, T | mm | 23.6 |
| Cohesion ratio, T/D | | 1.69 |
| Foam properties | | |
| Foam thickness | mm | 60 |
| Aged density | kg/m$^3$ | 31.7 |
| Cell size vertical | mm | 0.34 |
| Cell size extrusion | mm | 0.26 |
| Cell size horizontal | mm | 0.40 |
| Closed cell content, ASTM D 2856-90 | % | 96.1 |
| Compressive strength, V | kPa | 175 |
| Compressive strength, E | kPa | 210 |
| Compressive strength, H | kPa | 170 |
| Shear strength, ASTM C-273 | kPa | 140 |
| Tensile strength, ASTM D-1623 | kPa | 70 |
| Water vapor permeability, SIA 279 | ng/Pa · s · m | 2.0 |
| Water vapor resistance, SIA 279, $\mu$-value | | 101 |

EXAMPLE 5

The thermal conductivity of a honeycomb polystyrene foam versus two monolithic polystyrene foams was tested. In all cases a polystyrene formulation with carbon dioxide as blowing agent was used. The foaming conditions were in all cases the same.

The results are shown in Table IV. The honeycomb foam, showing an improvement in thermal conductivity of 5 to 5.2 percent versus two monolithic foams having the same density and thickness and produced from the same polymer/blowing agent composition, clearly illustrates the advantage that foams of the present invention demonstrate when compared to foams produced by means of the prior art.

TABLE IV

| | Honeycomb foam | Monolithic foam | |
|---|---|---|---|
| Average thickness, mm | 82 | 80 | 80 |
| Cell size, thickness direction, mm | 0.29 | 0.3 | 0.31 |
| Aged foam density, kg/m$^3$ | 39.1 | 39.5 | 41.2 |
| Thermal conductivity, mW/m-K, 10° C. mean temperature, 90 days age | 32.5 | 34.3 | 34.2 |

What is claimed is:

1. A method for producing an alkylene aromatic polymer or copolymer multistrand or coalesced strand foam, comprising the steps of:
   (a) providing a foamable composition comprising at least one polymer selected from the group consisting of alkylene aromatic polymers and alkylene aromatic copolymers and a blowing agent formulation,
   (b) extruding the composition through a die having a plurality of orifices,
   (c) foaming the extruded composition at a foaming temperature which is above the glass-transition temperature or the melting temperature of the polymer or coplymer,
   (d) maintaining the foaming product at an elevated temperature for a sufficient period of time to obtain adhesion between individual foam strands, and
   (e) allowing the foamed product to cool,
   characterized in that in steps (d) and (e) the temperature of the foam is controlled based on the thermodynamic nature of the blowing agent formulation wherein:
   the blowing agent formulation has a low evaporative cooling capacity and step (e) includes an accelerated cooling of the foamed product or
   the blowing agent has a high evaporative cooling capacity and step (d) includes a transfer of additional heat to the foaming product.

2. The method of claim 1, wherein the blowing agent formulation comprises as a major component a blowing agent exhibiting a low evaporative cooling capacity, or a mixture of such blowing agents.

3. The method of claim 2, wherein the blowing agent is selected from the group consisting of carbon dioxide, nitrogen, a nitrous oxide, a noble gas, air and mixtures of one or more of such blowing agents.

4. The method of claim 2, wherein additionally minor amounts of a blowing agent exhibiting a high evaporative cooling capacity, or a mixture of such blowing agents, is present.

5. The method of claim 1, wherein the blowing agent formulation comprises as a major component a blowing agent exhibiting a high evaporative cooling capacity, or a mixture of such blowing agents.

6. The method of claim 5, wherein the blowing agent is selected from hydrocarbons, ethers, lower alcohols, partially halogenated hydrocarbons, ammonia, water and mixtures thereof.

7. The method of claim 5, wherein additionally minor amounts of a blowing agent exhibiting a low evaporative cooling capacity, or a mixture of such blowing agents, is present.

8. The method of claim 1, wherein the blowing agent has no ozone depletion potential.

9. The method of claim 8, wherein the blowing agent is selected from the group consisting of $CO_2$ and mixtures of $CO_2$ with at least one of water, ethanol, isopropanol, or dimethyl ether.

10. The method of claim 8, wherein the blowing agent is selected from the group consisting of (i) 1,1,1,2-tetrafluoroethane, (ii) 1,1,2,2-tetrafluoroethane, (iii) 1,1-difluoroethane, (iv) mixtures of two or more of these, and (v) mixtures of each compound or mixture with at least one of ethanol, isopropanol, dimethyl ether, water or carbon dioxide.

11. The method of claim 8, wherein the blowing agent formulation is selected from the group consisting of dimethyl ether and mixtures of dimethyl ether with at least one of water, ethanol, isopropanol or carbon dioxide.

12. The method of claim 6, wherein the blowing agent formulation is selected from the group consisting of hydrocarbons, and mixtures of hydrocarbons with at least one of dimethyl ether, carbon dioxide, 1,1,1,2-tetrafluoroethane, 1,1,2,2-tetrafluoroethane, or 1,1-difluoroethane.

13. The method of claim 1, wherein the polymer is comprised of monovinylidene aromatic monomers selected from the group consisting of styrene, α-methylstyrene, a styrene having alkyl and/or halo substituents on the aromatic ring and mixtures thereof.

14. The method of claim 1 wherein the copolymer is comprised of alkylene aromatic monomers and other polymerizable monomers.

15. The method of claim 14, wherein the alkylene aromatic monomers are present in an amount of at least 50 percent by weight based on the weight of the total monomers.

16. The method of claim 14, wherein the other polymerizable monomers are selected from the group consisting of acrylic monomers, alkyl acrylate monomers, olefinic monomers and mixtures thereof.

17. The method of claim 1, wherein the polymer or copolymer composition is substantially free from adhesive additives.

18. The method of claim 1, wherein the foaming temperature is 1–50° C. above the glass-transition temperature or melting temperature of the polymer or copolymer.

19. The method of claim 1, wherein the theoretical diameter of individual foamed strands is equal to or greater than the distance between the orifices of the die.

20. The method of claim 1, further comprising co-extruding a non-alkylene aromatic foamable polymer or copolymer through the multi-orifice die, whereby a foam composition is produced comprising at least one alkylene aromatic polymer or copolymer foam component and at least one non-alkylene aromatic polymer or copolymer foam component.

21. The method of claim 20, wherein the non-alkylene aromatic foamable polymer is polypropylene.

* * * * *